Figure 1:
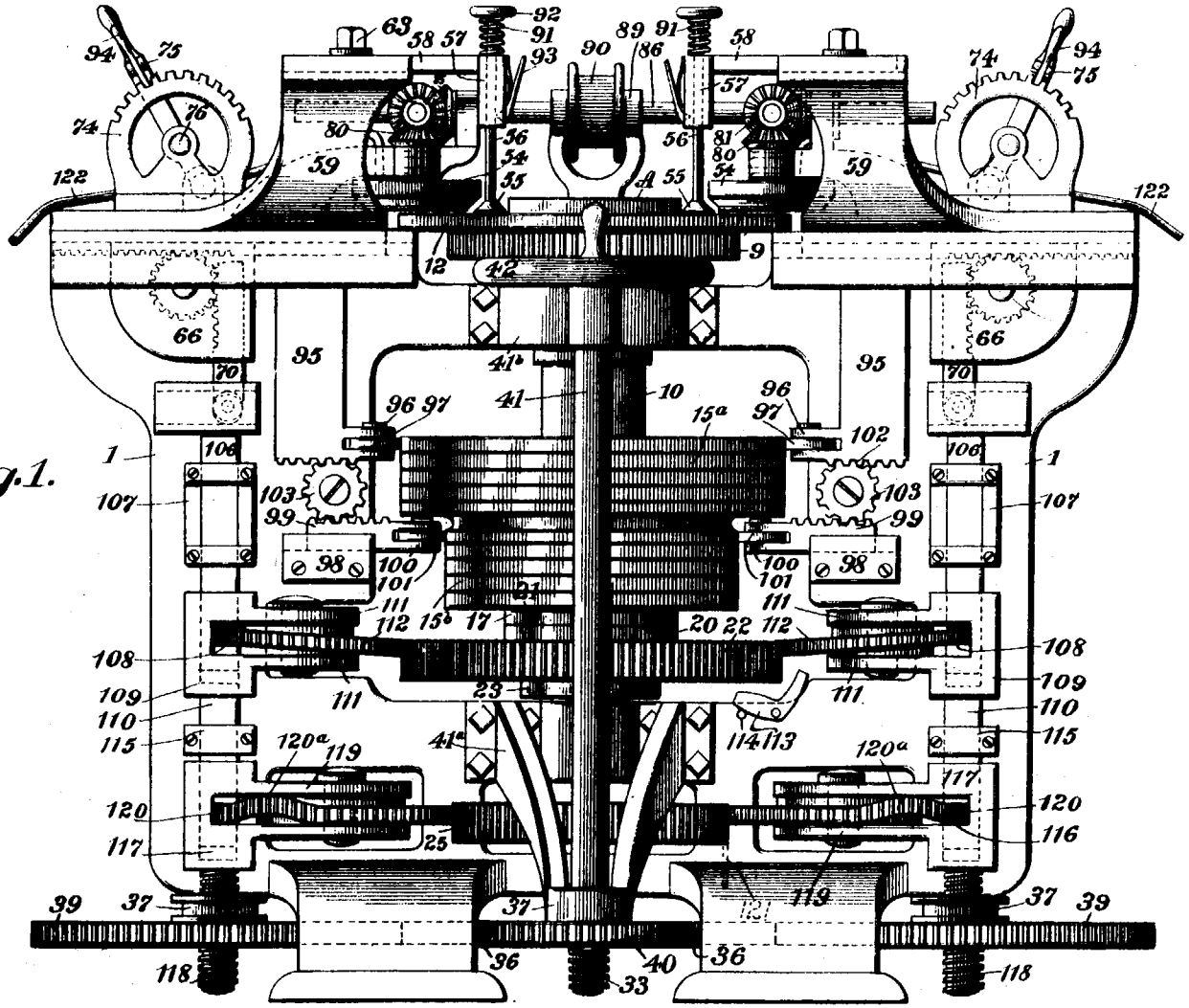

FIP8201 OR RE 11,405

T. E. AVERY.

MACHINE FOR CURLING HAT BRIMS.

Re. No. 11,405. Reissued Mar. 20, 1894.

BEST AVAILABLE COPY

WITNESSES:

J. F. Kinch.

M. T. Longden.

INVENTOR

T. E. Avery

BY

O. M. Smith

ATTORNEY

THE NATIONAL LITHOGRAPHING COMPANY, WASHINGTON, D. C.

223. Apparel Apparatus,

14

7 Sheets—Sheet 2.

T. E. AVERY.

MACHINE FOR CURLING HAT BRIMS.

No. 11,405. Reissued Mar. 20, 1894.

WITNESSES:

J. F. Finch.

M. S. Longden.

INVENTOR

T. E. Avery

BY

P. W. Smith Jr.

ATTORNEY

THE NATIONAL LITHOGRAPHING COMPANY, WASHINGTON, D. C.

7 Sheets—Sheet 3.

T. E. AVERY.

MACHINE FOR CURLING HAT BRIMS.

No. 11,405. Reissued Mar. 20, 1894.

WITNESSES:

J. F. Finch.

M. T. Longden.

INVENTOR

T. E. Avery

BY

G. M. Smith Jr.

ATTORNEY

THE NATIONAL LITHOGRAPHING COMPANY, WASHINGTON, D. C.

T. E. AVERY.

MACHINE FOR CURLING HAT BRIMS.

No. 11,405. Reissued Mar. 20, 1894.

WITNESSES:

J. F. Kinch.

M. T. Longden.

INVENTOR

T. E. Avery

BY

P. W. Smith Jr.

ATTORNEY

THE NATIONAL LITHOGRAPHING COMPANY, WASHINGTON, D. C.

T. E. AVERY.

MACHINE FOR CURLING HAT BRIMS.

No. 11,405. Reissued Mar. 20, 1894.

WITNESSES:

J. F. Kinch.

M. T. Longden.

INVENTOR

T. E. Avery

BY

G. M. Smith Jr.

ATTORNEY

THE NATIONAL LITHOGRAPHING COMPANY,
WASHINGTON, D. C.

T. E. AVERY.
MACHINE FOR CURLING HAT BRIMS.
No. 11,405. Reissued Mar. 20, 1894.
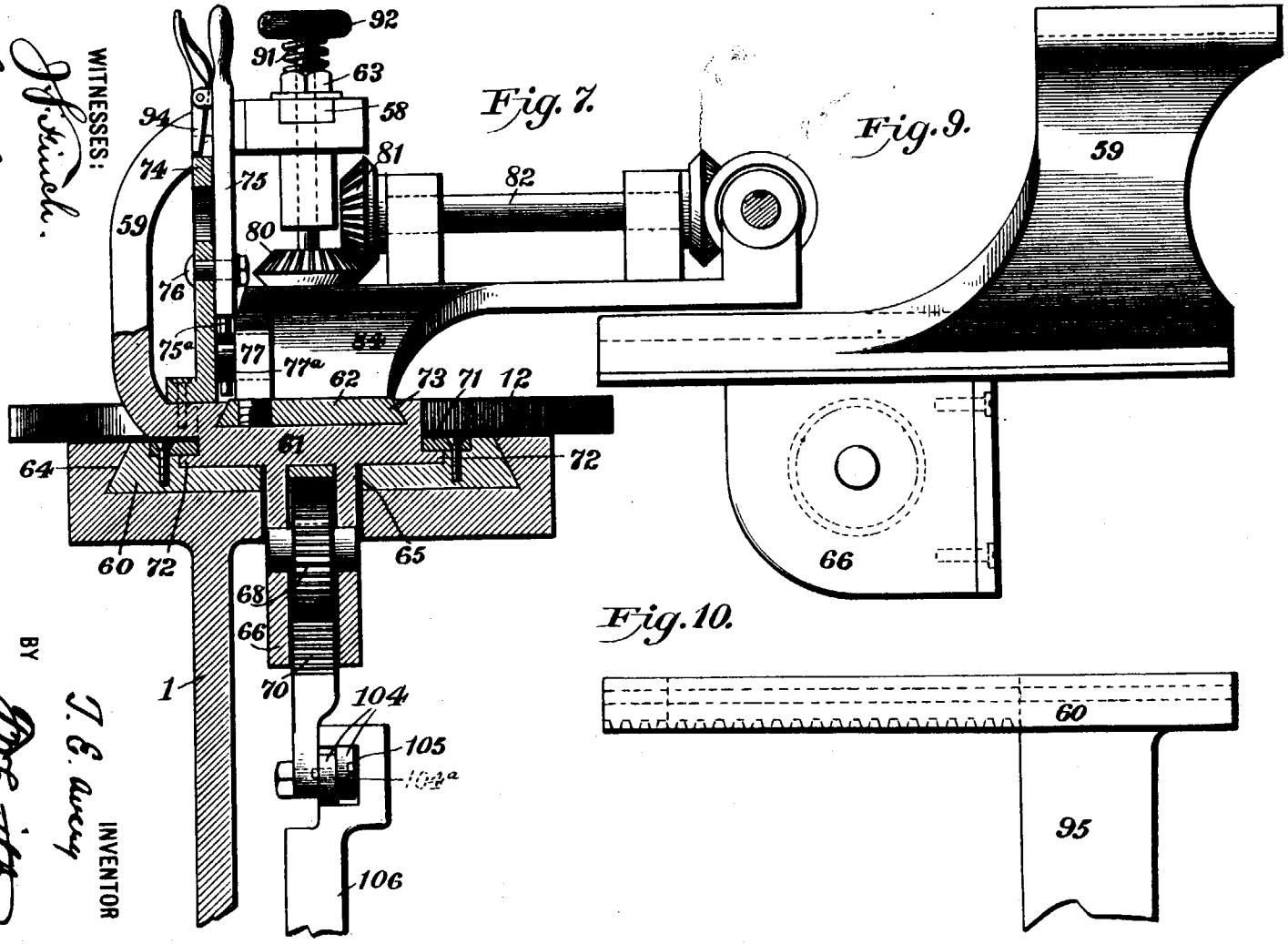
WITNESSES:
J. F. Finch.
M. T. Longden.
INVENTOR
T. E. Avery
BY
J. M. Smith
ATTORNEY
THE NATIONAL LITHOGRAPHING COMPANY, WASHINGTON, D. C.

7 Sheets—Sheet 7.

T. E. AVERY.

MACHINE FOR CURLING HAT BRIMS.

No. 11,405. Reissued Mar. 20, 1894.

WITNESSES:

J. F. Rivett.

M. T. Longden.

INVENTOR

T. E. Avery

BY

P. M. Smith Jr.

ATTORNEY

THE NATIONAL LITHOGRAPHING COMPANY, WASHINGTON, D. C.

UNITED STATES PATENT OFFICE.

THOMAS E. AVERY, OF DANBURY, CONNECTICUT.

MACHINE FOR CURLING HAT-BRIMS.

SPECIFICATION forming part of Reissued Letters Patent No. 11,405, dated March 20, 1894.

Original No. 472,974, dated April 19, 1892. Application for reissue filed December 29, 1893. Serial No. 495,129.

*To all whom it may concern:*

Be it known that I, THOMAS E. AVERY, a citizen of the United States, residing at Danbury, in the county of Fairfield and State of Connecticut, have herewith surrendered Letters Patent No. 472,974, granted to me April 19, 1892, for Improvements in Machines for Curling Hat-Brims, and have prayed that Letters Patent may be reissued to me for the same invention; and I do hereby declare the following to be a full, clear, and exact description of the invention, such as will enable others skilled in the art to which it appertains to make and use the same.

My invention has for its object, to provide a machine requiring the attendance of but a single operator, which machine will readily and uniformly curl the brims of all sizes and styles of hats, the special purpose in view being to produce a machine that will curl hats of normal shape, that is, hats having the shape of an egg-oval in cross section.

A further object of my invention is to regulate the formation of the curl to the brims by the positive action of two series of cams, which by their combined actions in connection with the slides which carry the curling devices, insure perfect accuracy in the operation of such devices and do away with the necessity of springs.

Still further objects of my invention are to afford independent operations of the curling devices and the hat clamping mechanism, to provide adjustable means for controlling the curling devices, so that they can operate upon hat brims of varying widths, without changing the cams by which the necessary to-and-fro movements are ordinarily imparted to such curling devices, and to do away with subsequent top ironing which has hitherto been deemed necessary after the hat has been removed from the curling machine.

Heretofore, so far as I am aware, no curling machine has been produced that could curl a hat in which the oval was not alike at both ends. It is, of course, well understood that the shape of the average human head in horizontal section is a more or less elongated egg oval, the longer transverse diameter being at the back, and the hats to be salable must be formed to this general shape. It has been necessary, therefore, with all machine-curled hats, to help the hat back to its original shape by hand or a setting machine after the operation of curling has been performed. This plan is seriously objectionable, however, as the hats will not retain the egg-oval shape, but tend to assume the form of a true oval, which was the shape to which they were curled by the machine. My present machine takes a hat blocked to the shape of an egg oval and curls it in that shape, so that the hat must under all circumstances retain its egg oval shape in horizontal section. I also provide adjustments for varying the shape of the oval without departing from the egg-oval principle and for changing the various ovals to slight or extreme egg ovals, which are so simple as to require but a moment's time and to be within the skill of any ordinary workman.

My invention is also equally applicable to the curling of any of the irregular forms common in ladies' felt hats.

With these ends in view I have devised the novel machine of which the following description, in connection with the accompanying drawings, is a specification, numerals and letters being used to designate the several parts.

Figure 2:
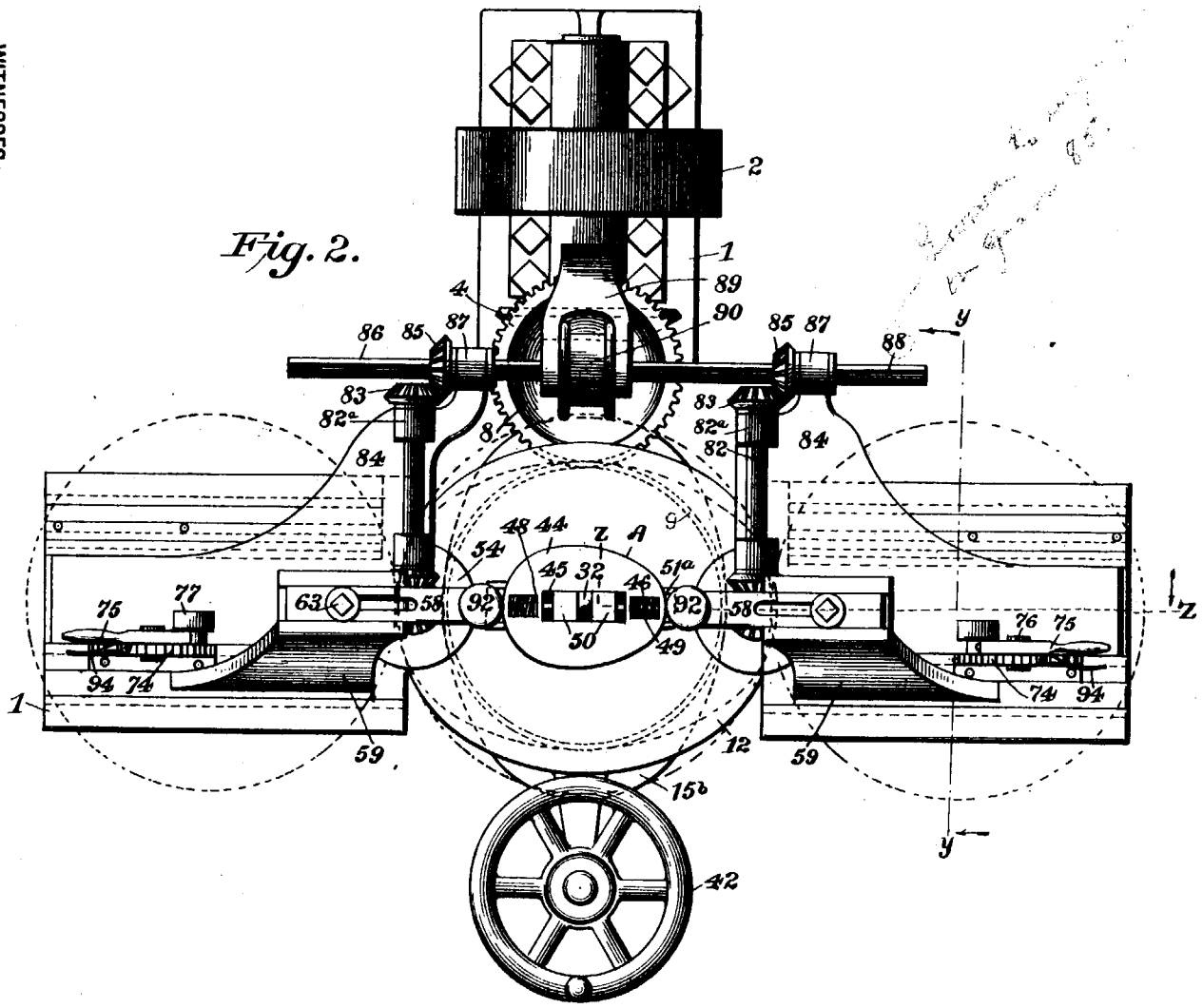
Figure 3:
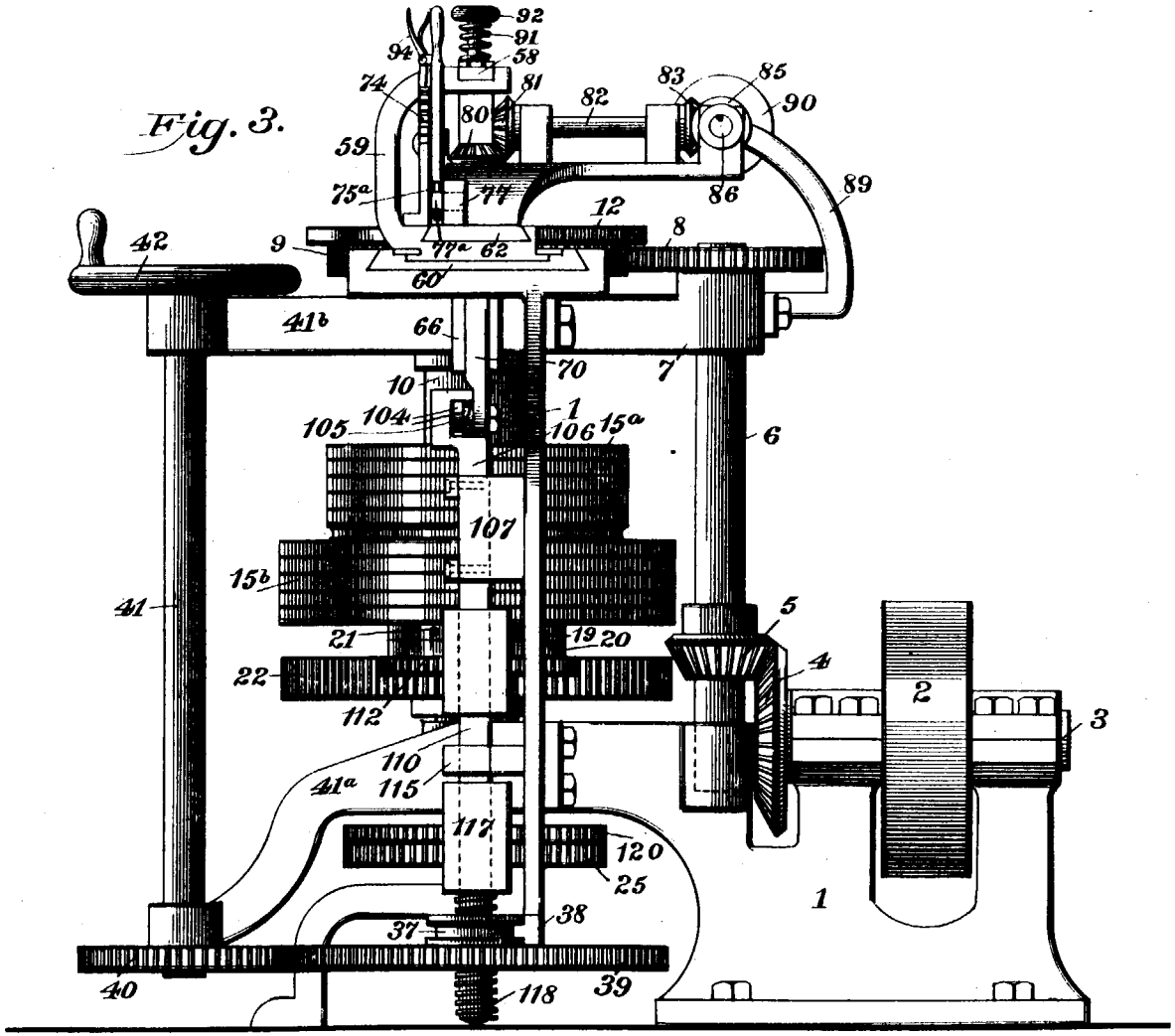
Figure 4:
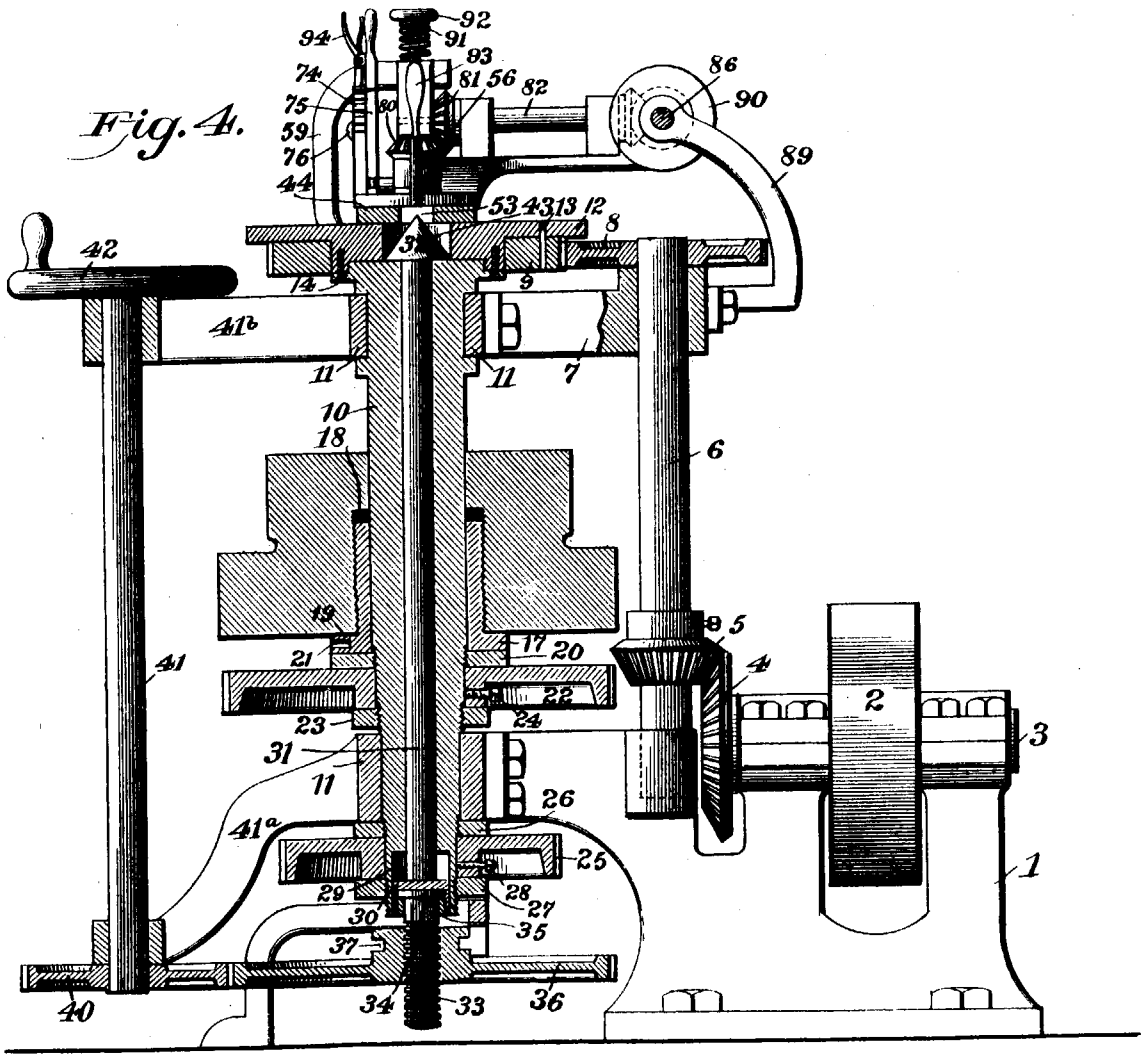
Figure 6:
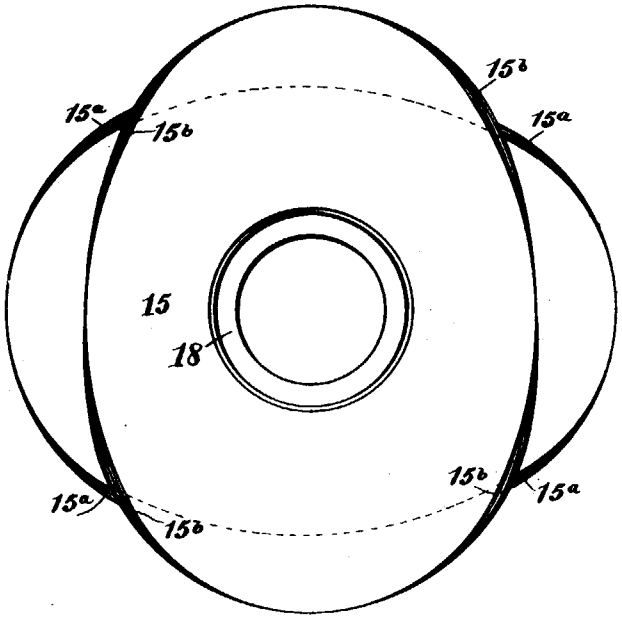
Figure 5:
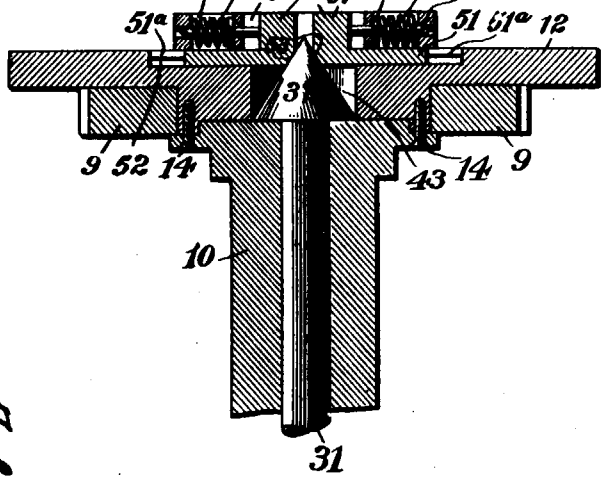
Figure 8:
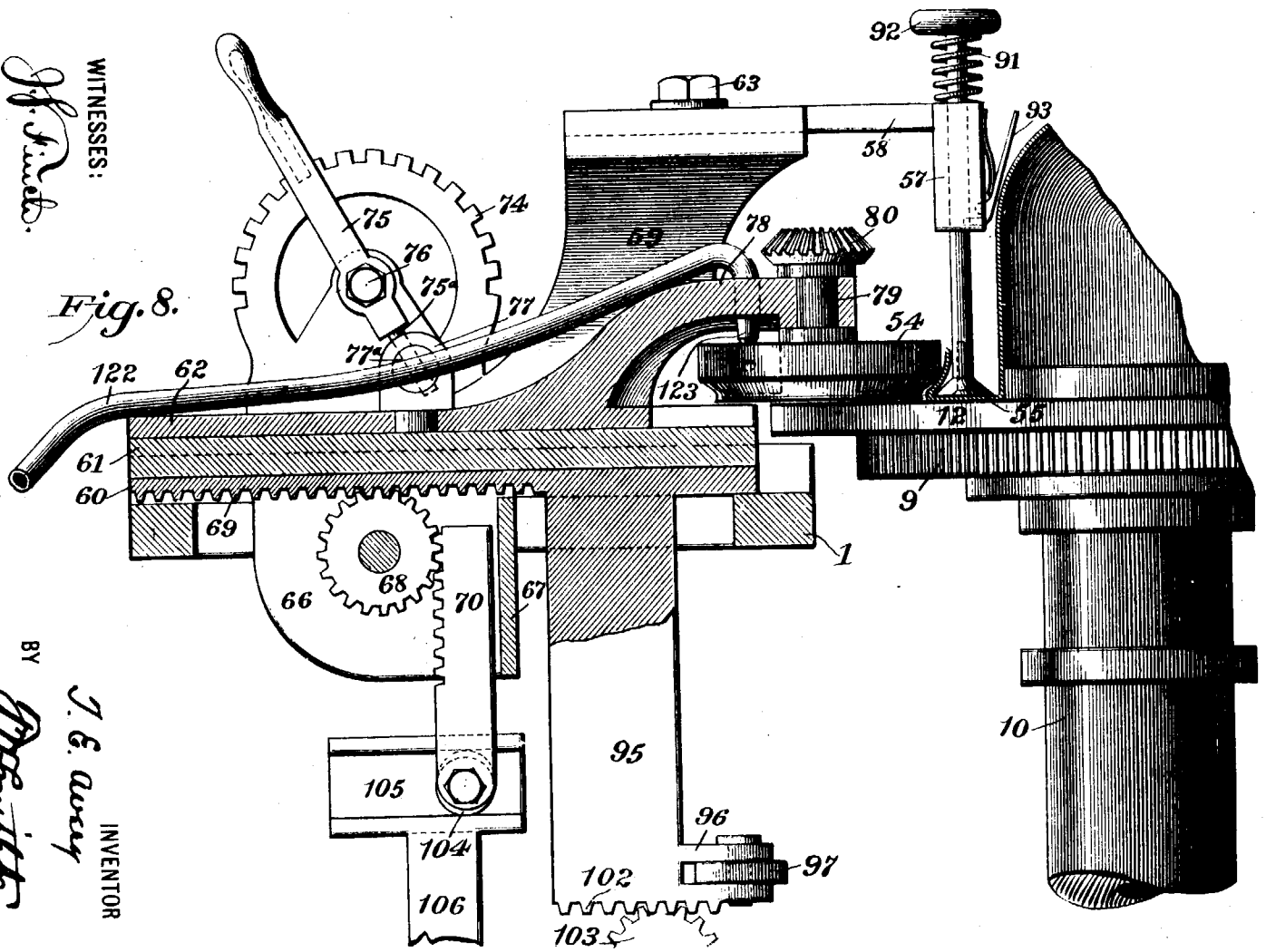

Figure 1, is a front elevation; Fig. 2, a plan view; Fig. 3, a side elevation as seen from the right in Fig. 1; Fig. 4, a vertical central section looking toward the left in Fig. 1; Fig. 5, an enlarged sectional view on a plane at right angles to a plane of Fig. 4; Fig. 6, an enlarged inverted plan view of the double compound cam, the position corresponding with Fig. 3; Fig. 7, an enlarged sectional view substantially on the line denoted by $y$, $y$, in Fig. 2, looking toward the left; Fig. 8, an enlarged sectional view on the line denoted by $z$, in Fig. 2, looking toward the front; Fig. 9, an enlarged detail view of one of the slides which carry the forming rollers; and Fig. 10 is an enlarged detail view of one of the slides, which will be specifically referred to by a reference number.

1 denotes the frame of the machine, the exact style and arrangement of which are not of the essence of my invention. Power is applied to all portions of the machine except the curling rollers, by a belt (not shown) running over a pulley 2 on a shaft 3, provided with a bevel-gear 4. This gear meshes with a bevel gear 5 on a vertical shaft 6, the lower e d of which is stepped in the frame-work, the upper end thereof being journaled in a bracket 7, bolted to the frame. At the upper end of the shaft 6 is a gear 8, which meshes with a gear 9 on a hollow vertical spindle 10, journaled in boxes 11, bolted to the frame.

12 denotes an oval plate carried by the spindle, upon which the hat brim rests during the operation of curling. I have shown gear 9 and plate 12 as secured together by means of pins 13 (one only being shown) and the plate as secured to the spindle by means of screws 14. The special manner in which the parts are secured together is of course not the essence of my invention.

15 is a double compound cam which consists of two axially concentric sections, each section being exactly alike and made up of different ovals, the ovals of each section corresponding to each other both as a whole and individually in respect to their relative arrangement. I have shown only a limited number of these ovals, but this number is ample to provide for the various ovoidal shapes that are ordinarily required in the curling of a hat brim. The cams of each section are of uniform length and width at their longest and shortest diameters respectively, the only variation being at the quarters of such cams, and this difference I have not illustrated since it is a very ordinary feature common in this art. The sections of this compound cam are arranged at right angles to each other, but are axially concentric as will be evident from Figs. 1, 3 and 6, and the object of this arrangement will be presently explained. The ovals of the upper section are denoted by $15^a$ and the ovals of the lower section by $15^b$. Cam 15 is held against rotation on the spindle by means of a spline 16, and is adjustably secured thereto by a nut 17, which is externally screw-threaded to engage an internal screw-thread in a central recess 18 in the cam. The nut is provided with a flange 19, which rests upon a nut 20, engaging a corresponding thread upon the spindle. When it is desired to raise or lower the cam on the spindle, a rod is inserted in one of the holes 21 in flange 19 and said nut is rotated on the spindle, thereby raising the cam up or down, as may be required, said cam sliding freely on the spindle and the spline. Below nut 20 on the spindle is a gear 22, the purpose of which will presently be explained.

23 is a nut under gear 22, which is threaded to engage a corresponding screw-thread on the spindle, the thread for nut 20 being of less diameter than the thread for nut 17, so as to permit the parts to be readily assembled. Gear 22 is shown as clamped between nuts 20 and 23, and is additionally locked to the spindle by a set screw 24. Below the lower box 11 of the spindle is another gear 25, the purpose of which will presently be explained. This gear is clamped between nuts 26 and 27, and is additionally locked to the spindle by a set screw 28. Nuts 26 and 27 are of different diameters for the same reason as the other nuts on the spindle. In the base of the spindle is a socket 29, which receives an enlargement 30 at the lower end of the rod 31, which is adapted to slide freely in the spindle. At the upper end of rod 31 is a cone 32, the purpose of which will presently be explained. The lower end of rod 31 is provided with a threaded portion 33, which may be made integral therewith or be made separately, as shown in the drawings. I have shown the threaded portion as provided with a flange or head 34, lying in a socket at the lower end of enlargement 30 and locked therein by a nut 35.

36 denotes a gear-wheel, the hub of which is internally threaded to engage thread 33, and is provided with an annular groove 37, which is in turn engaged by an angle-piece 38, secured to the frame of the machine. This angle-piece holds gear-wheel 36 in position, but permits it to be rotated freely when it is desired to raise or lower rod 31. Gear-wheel 36 meshes with similar gear-wheels 39 on opposite sides thereof, the purpose of which will be presently explained. Gear wheel 36 and the two gear-wheels 39 are operated simultaneously by means of a pinion 40 at the lower end of the shaft 41, which is journaled in brackets $41^a$ and $41^b$, secured to the frame, and is provided at its upper end with a hand-wheel 42 for convenience in operation. Cone 32 at the top of rod 31 lies in a central recess 43 in oval plate 12 and extends above the top of said plate. The hat to be acted upon is placed upon a suitable holder, which as a whole, I have designated by A. (See Figs. 2, 4, and 5.)

The construction of the holder shown in the drawings is as follows:

44 denotes an oval plate, which passes within the crown of the hat, said plate corresponding in shape and size with said crown-opening and also with the general oval of the compound cam—that is to say, corresponding at the ends and sides with the oval of the cam.

45 denotes a longitudinal opening in the plate which must always bear a certain definite relation to the size of the hat that the holder is made to fit, the length of the opening increasing in regular proportion to the length of the plate, the latter dimension corresponding, of course, to the regular size of the hat.

50 denotes blocks formed integral with slides 51. The slides lie in a recess 52 in the top of the plate 12 and the blocks extend upward into opening 45. The blocks are made just large enough to pass freely into opening 45. They have no lateral movement in said opening, but are free to move longitudinally therein. The holder is thus accurately centered without adjustment by simply placing it in position on the block. The inner ends of the slides are preferably beveled, as at 53, (see Fig. 4,) to correspond with the bevel of cone 32. The slides are rabbeted at their sides and are held in place by plates 51[a], which are secured to plate 12.

When the holder with the hat upon it has been placed in position upon the blocks, rod 31 is raised in the manner already described, which forces the cone upward and moves the blocks outward until they are stopped by contact with the ends of opening 45. This automatic stoppage of the movement of the cone and the outward movement of the slides enables me to curl hats of any size without the slightest change of adjustment, placing precisely the same curl upon each hat. For instance, a five and one-half hat may be followed by a seven and one-half hat, and vice versa, and each will have the proper curl imparted to it, owing to the fact that the opening 45 in the holder for each hat bears such a relation to the size of the hat as to adjust the curling mechanism automatically, all of which will presently be more fully explained. In order to insure that the hat shall not slip on the holder under any circumstances, I provide pins 47, having collars 48 lying in openings 46 in plate 44.

49 denotes springs lying in the openings and surrounding the pins, the ends of which bear, respectively, against the collars and the outer end walls of said openings, so as to hold the pins normally retracted. The inner ends of the pins pass through openings in the walls between recesses 45 and 46 and rest against blocks 50 on slides 51, and the inner ends of said pins pass through the walls at the outer ends of recesses 46. It will thus be seen that when said slides and blocks are moved outward the pins are moved outward also and engage the hat, retaining it securely in position on the holder.

Turning now to Figs. 7, 8, 9, and 10, I will describe the curling mechanism, which is shown clearly in Fig. 8, in which view the parts are shown in operative position. The brim is curled by curling-rollers 54 over forming-rollers 55. As the two sides of the machine are exact duplicates and as the entire operation of curling could be performed by one set of rollers, although two sets are preferably used, I will confine the description to one side of the machine.

The forming-roller is carried by a spindle 56, which slides in a guide 57 on a slide 58, which in turn slides in a bracket 59, extending upward from a slide 61. In practice the forming-roller may or may not be heated. I have shown no means of heating it in this instance. The curling-roller, however, should be heated in any suitable manner. I have shown the curling-roller as made hollow and open at the top, and have shown a flexible gas-pipe 122 as extending into the opening. A suitable burner 123 is placed at the end of the pipe within the opening, said pipe and burner being secured in place in any suitable or preferred manner. It will be seen that the brim is not bent to place and ironed there, but that it is rolled to shape by being passed between rollers, one or both of which are heated. Slide 58 is simply for the purpose of adjustment and is locked in bracket 59 by a bolt or set screw 63. There are three other slides, however, one within the other, which perform important functions in the act of curling. These slides are clearly shown in section in Fig. 7. The lower slide, which I have designated by 60, moves in ways 64 in the frame. Within this slide is an intermediate slide, which I designate as 61, and within slide 61 is an upper slide, which I designate as 62. Slide 60 is provided with longitudinal slots 65, and slide 61 is provided with downwardly extending plates 66, which pass through said slots and are free to move therein, as will presently be fully explained.

The inner ends of plates 66 are connected by a cross piece 67, and between said plates is mounted a pinion 68, which engages a rack 69 on the under side of plate 60, and also a vertical rack 70, which is held in place by the cross piece, the function of which will presently be explained. In assembling, slide 61 is dropped down to place in slide 60 and is held in position therein by plates 71, which are screwed to plate 60 and engage flanges 72 on plate 61, serving as ways therefor. Slide 62 engages dovetail ways 73 in plate 61.

74 denotes a segment-plate, which is rigidly secured to plate 61.

75 denotes a lever fulcrumed on a stud 76, projecting from the segment-plate, the lower end of which is reduced, as at 75[a], and passes through a rotary plug 77[a] in a hub 77, extending upward from plate 62, so that oscillation of the lever will move said plate inward or outward, as may be desired.

78 denotes a bracket extending inward from plate 62, in the end of which is journaled a vertical shaft 79, which carries the curling-roller. At the upper end of this shaft is a bevel-gear 80, which meshes with a bevel-gear 81 on a shaft 82, mounted in boxes 82[a] on a bracket 84, extending upward from plate 62. At the other end of shaft 82 is a bevel-gear 83, which engages bevel-gear 85 on a shaft 86. This shaft is mounted in boxes 87 on the two brackets 84, which extend from the two slides 62 on the opposite sides of the machine, as is clearly shown in Fig. 2. Gears 85 are keyed to the shaft, so as to rotate therewith, but also to slide longitudinally thereon, said gears being held in position by the boxes 87 on one side and the bevel-gears 83 on the other, as clearly shown in Fig. 2. The keys (not shown) in bevel-gears 85 engage a groove 88 in the shaft. Shaft 86 is supported centrally by a bracket 89, which is secured to and extends upward from bracket 7. The upper end of this bracket is branched, and between the branches is a belt pulley 90, rigidly secured to the shaft, through which motion is imparted to the curling-rollers in the manner just described, the belt being omitted from the drawings for convenience in illustration.

The forming-roller 55 is normally held out of operative position by a spring 91, surrounding the spindle, the ends of which bear respectively against guide 57 and a hand piece 92, placed at the upper end of the spindle for convenience in operation. After being placed in operative position the forming-roller is held there by means of a spring-actuated pawl 94, which engages notches in the periphery of segment-plate 74.

95 denotes an arm extending downward from plate 60, and preferably formed integral therewith, as shown in the drawings. This arm is provided with ears 96, between which is mounted in the horizontal plane a roller 97, which is adapted to engage either one of the ovals $15^a$ of the upper section of the double compound cam 15.

98 is a bracket-plate secured to the frame, in which slides a rack 99, having at its inner ends ears 100, between which is journaled in the horizontal plane a roller 101, which is adapted to engage either of the ovals $15^b$ of the lower section of double compound cam 15.

102 denotes a rack at the lower end of arm 95.

103 is a pinion journaled to the frame and engaging racks 99 and 102, so that the two racks must move simultaneously, but in opposite directions.

As has already been stated, the several ovals in the two sections of the compound cam have a definite relation to each other—that is to say, the first oval of the upper section corresponds with the first oval of the lower section, the second oval of the upper section with the second oval of the lower section, &c. It will thus be seen that the two sections of the compound cam 15 act as complements one to the other, and that the rollers 97, 101, will at all times be held in close contact with the ovals $15^a$, $15^b$.

At the lower end of rack 70 are rollers 104, which lie in a groove 105 in a slide 106, which moves in a suitable guide 107. The lower end of this slide is provided with a recess 108 and lies in a socket 109 at the upper end of a slide 110. It will be noticed (see Fig. 7) that these rollers are pivoted in different horizontal planes and in such position that one will engage the upper side of the groove and the other the lower side, thus preventing lost motion under any circumstances. The pin $104^a$, upon which these rollers are pivoted, is specially provided with an eccentric shoulder, upon which one of the rollers is pivoted. (See dotted lines, Fig. 7.) Socket 109 is provided with inwardly extending arms 111, between which is pivoted a cam-gear 112. It will be seen from Fig. 1 that while the arbor of this cam-gear is in the vertical plane, the gear itself lies in a plane at an acute angle to the horizontal plane. The edge of this gear engages recess 108 in slide 106. The effect, therefore, of rotation of the cam-gear, will necessarily be to steadily raise slide 106 during half a revolution of the cam-gear and then to steadily lower it during the other half-revolution of said cam-gear. As cam-gear 112 is just half the size of gear 22 by which it is driven, it follows that the cam-gear must make two full revolutions during each revolution of the central spindle, all of which will presently be fully explained. The inner edge of the cam-gear meshes with gear 22 on the central spindle 10. When the special effect of cam-gear 112 is not required, gear 22 is loosened on spindle 10, by loosening nut 23 and turning set screw 24 backward, and is locked against the possibility of rotation by a catch 113, one arm of which is placed between two teeth of the gear and locked in that position by means of a pin 114, which engages the frame, said pin being shown in Fig. 1 as holding the catch out of operative position instead of in operative position. Slide 110 is retained in operative position by a guide 115. The lower end of this slide is provided with a recess 116 and lies in a socket 117.

118 is a threaded rod rigidly secured to and extending downward from the socket. This threaded rod passes through a correspondingly-threaded opening in the hub of gear-wheel 39. The hub of this gear-wheel is provided with an annular groove 37, similar to the groove in the hub of gear wheel 36, said groove being engaged by an angle-piece (not shown) similar to the angle-piece 38, (see Figs. 3 and 4,) which engages the groove 37 in said gear-wheel 36. It will be noticed (see Fig. 1) that the thread of rod 118 is a right-hand thread and thread 33 on rod 31 is a left-hand thread, so that when rod 31 is moved downward rod 118 and the parts carried thereby will be moved upward, as will be more fully explained. Socket 117 is provided with inwardly extending arms 119, between which is pivoted a cam-gear 120. This cam-gear meshes with gear 25 on central spindle 10, and the outer edge thereof engages recess 116 in slide 110. It will be noticed that this cam-gear is pivoted in the horizontal plane and that the operative face thereof is curved laterally, as at $120^a$. (See Fig. 1.) As a matter of fact there are two of these lateral curvatures $120^a$ on cam gear 120, the other curvature not being shown in the drawings, which are distant from each other just one-fourth the circumference of the cam-gear. As this cam-gear and gear 25, by which it is driven, are of equal size, it follows that the central spindle and the cam-gear will complete their rotations simultaneously. It is obvious that the effect of these lateral curvatures will be to raise slide 110 and the parts above it quickly and then lower it again twice during each revolution of the cam-gear, and, furthermore, that said movements will take place at two successive quarters of the hat instead of at alternate quarters. The adjustment in practice is such that the two movements take place when the quarters at the large end of the oval are being operated upon by the curling mechanism, as will be more fully explained. When it is not desired to use this cam-gear, gear 25 on the central spindle, by which it is driven, is loosened on the central spindle by loosening nut 27 and turning set-screw 28 outward. In order to avoid the possibility of movement, the gear is preferably locked against rotation with the spindle in any suitable manner, as by a catch 113, such as is shown in connection with gear wheel 22, or by a pin 121, (see dotted lines in Fig. 1,) which passes through the rim of the wheel or between two of the gear-teeth and engages the frame of the machine.

The ordinary operation of the machine is as follows: Let us suppose that it is desired to curl hats of an ordinary egg oval corresponding to any of the ovals of the compound cam. The cam is adjusted by means of nut 17 to place the required ovals in operative position relative to rollers 97 and 101. The holders used for the hats of course correspond with the general oval of the cam. As cam-gears 112 and 120 are not required, gears 22 and 25 on the central spindle, by which said cam-gears are driven, are loosened in the manner described and are locked against rotation with the spindle in any suitable manner, as described. For the sake of clearness, let us suppose a hat to be in position on the machine and the act of curling to have been finished, the operator disengages pawl 94 from the teeth of the segment-plate and moves lever 75 inward from the position shown in Figs. 1 and 8. As slide 61 and the segment-plate carried thereby are locked in position by pinion 68, racks 69 and 70, the slides, cam-gears, &c., as already described, it follows that slide 62, carrying the curling roller, will be carried out of operative position by means of lever 75. The operator then disengages spring-actuated pawl 93 from the notch (not shown) in spindle 56, which permits spring 91 to raise the forming-roller 55 out of operative position. Hand-wheel 42 is then operated, and, by means of a pinion 40, gear-wheels 36 and 39, and the connections already described, moves threaded rod 118 upward, this movement carrying the sockets, slides, cam-gears, and rack 70 upward also, the teeth of the cam-gears sliding freely over the teeth of the gears 22 and 25 when the upward movement takes place. The upward movement of rack 70 imparts movement to pinion 68, which is also in engagement with rack 69 on the under side of slide 60, the effect of which is to carry slides 61 and 62, with the forming and curling rollers, inward toward the center, it being understood that the curling roller has been previously moved backward by means of lever 75 far enough to permit the forming-roller to be released from the curled brim and moved upward out of the way by the spring which controls it. It will be apparent that slides 61 and 62 must move together, owing to the fact that lever 75 is pivotally connected to slide 62 and is fulcrumed upon and locked to slide 61, the latter slide carrying pinion 68, which engages the rack on slide 60. This movement of the hand-wheel also acts by means of pinion 40, gear-wheel 36, and the connections already described at length, to move rod 31 and cone 32 downward, which loosens blocks 50 in opening 45, so that the holder, with the hat upon it, may be readily removed from the machine. Springs 49 also act to move pins 47 inward, withdrawing them from the hat and permitting the latter to be readily removed from the holder. Another holder with a hat body thereon is then placed in position on the blocks. The inner ends of the pins rest at all times against the blocks, the latter acting to center the holder and hat, rendering it impossible for the holder to be placed on the oval plate in any position except the correct one. As soon as the hat and holder are in position, hand-wheel 42 is turned in the opposite direction, which raises rod 31 and the cone, thereby forcing blocks 50 outward until they are stopped by engagement with the ends of opening 45, and also causing the pins to engage the hat body, as already described. It will thus be seen that this upward movement of the rod and cone secures the hat firmly upon the holder and secures the holder firmly in position on the machine. I have not shown rod 31 and the cone in the raised position, as the change in position of the cone and blocks caused by the operation of the hand-wheel will be obvious from Figs. 2 and 5. In addition to the operations already described this movement of the hand wheel through the engagement of gear-wheel 36 with gear-wheel 39 acts to move slides 106 and 110, together with rack 70, downward to the position shown in Fig. 8, the effect of which is to move slides 61 and 62 outward, slide 61 being moved to the position shown in Fig. 8, slide 62, however, being still further retracted through the former movement of lever 75, as already described. This movement places forming-roller 55 in just the position required to form the desired curl upon the brim, it being understood that set-screw 63, which locks slide 58 in position, is never touched except when changing from one width of hat brim to another. The operator next presses the forming roller down to operative position against the power of spring 91, and then locks it there by means of pawl 93 and the notch (not shown) in the spindle. The next movement is to disengage pawl 94 from the segment-gear and swing lever 75 outward to the position shown in Figs. 1 and 8, to place curling-roller 54 in operative position, as clearly shown in Fig. 8.

As has already been fully explained, the opening 45 in the holder bears such a relation to the size of the holder itself (the size of the holder of course corresponding with the size of the hat) that when the operative parts have been moved into position by hand-wheel 42, as already described, and the outward movement of block 50 has been stopped by the ends of opening 45, the forming-roller will be in the exact position required to curl the brim of the special size of the hat upon the holder. Suppose a small sized hat to be followed by a large sized hat. The opening in the holder will be larger, and it follows, necessarily, that the cone will be moved upward farther and will move blocks 50 outward farther before said blocks will be stopped by engagement with the end walls of opening 45, and as the outward movement of slides 61 and 62, carrying the forming rollers, is proportionate to the upward movement of the cone, the forming-roller will be moved outward from the body of the hat a correspondingly greater distance than it was moved when the smaller sized hat was on the machine. The operation of the forming-roller when once adjusted to a certain width of hat brim is therefore wholly automatic without regard to the size of the hat and only requires to be adjusted when the width of the curl is changed. The movement of the several parts in the operation of curling will be clearly understood by Fig. 1 in connection with Fig. 8.

It will be seen that the two sides of the machine are exactly alike. I have used the singular form in describing the parts, for the reason that the machine is operative with only one side. In practice, however, both sides are preferably used. It makes no difference which of the five ovals of the two parts of the compound cam are adjusted to operate in connection with rollers 97 and 101. Bearing in mind that the two sections of this cam are precisely alike but are arranged transverse to each other and concentric to the same axis, it will be readily understood that when the cam revolves the outward movement of the slide 60 will be effected by the action of the upper section of the cam against the roll 97, while the inner movement of said slide will be caused by the action of the lower section of said cam against the roll 101 through the medium of the racks 102, 99, and the pinion 103. It will also be noted that these rolls are always maintained in contact with their respective cams by reason of the reverse action of the racks, thus doing away with the necessity of employing springs or their equivalents and rendering the movements of the slides 60 and the parts carried thereby positive and accurate. This movement of slides 60 is communicated to slides 61 and 62, owing to the fact that slides 61 and 62 are locked together by the segment-plate and lever 75, as fully described, and slides 61 are locked to slides 60 by means of pinions 68, racks 70, slides 106 and 110, and the parts operating in connection therewith, it being understood, of course, that slides 70 are held constantly in engagement with pinions 68 by means of cross-pieces 67, which connect the downwardly-extending plates 66, forming part of, or rigidly secured to, slides 61. During this operation slides 106 and 110, the cam-gears, &c., have no movement, but simply act to hold racks 70 against vertical movement, it being understood that as the three slides are moved backward and forward by the compound cam, rollers 104 will travel in grooves 105. It will be apparent, therefore, that the special oval of the compound cam that is in operative position will cause the forming and curling rollers in curling each brim to impart thereto the precise oval of the cam itself. It has been already fully explained that the five ovals of the compound cam cover all of the various ovals that are ordinarily required in the manufacture of hats. These ovals, as stated, vary from each other only at the quarters, the ends and sides being the same. It sometimes happens, however, that hats of an oval differing materially from any of the ovals of the compound cam are required. I therefore provide adjustments for varying the shape of the oval which enables me to curl a hat of any odd or irregular shape or size that can possibly be required, either in men's or women's hats. In the drawings I have shown rollers 97 and 101 as engaged with the upper ovals of the two sections of the compound cam. In practice these ovals are numbered and are known by their respective numbers, the middle oval being No. 1, the one below it No. 2, the bottom oval No. 3, the top oval No. 5, and the one below that No. 4, No. 5 being shown as in use. Suppose now that it is required to produce ovals narrower at the quarters than any of the ovals of the compound cam. The compound cam is used as before; but in addition to this, gear-wheel 22 is disconnected from the frame, catch 113 being thrown to the position shown in Fig. 1 and locked there, and said gear is locked to the central spindle in the manner described, it being understood, of course, that the gears 22 and 25 and cam-gears 112 and 120 are suitably marked, so as to insure their being accurately set when they are placed in use, it being obvious that the timing of the machine must be quite correct. The operation of gears 112 through an engagement of said gears with recesses 108 in slides 106 is to raise slides 106 and racks 70 steadily upward during half the revolution of said cam gears and then steadily lower them during the other revolution. The cam-gears are set so as to just complete an entire revolution while the central spindle carrying the oval plate and the hat is making half a revolution, the effect being to move slides 61 and 62 inward while the oval plate and hat are making a quarter revolution, the object being to narrow the oval at the sides of the hat more than at the ends thereof. Cam-gears 112 will act in the manner just described to move slides 61 and 62, and with them the forming and curling rollers, inward steadily until the side of the hat is reached, and will then move them steadily outward again until the end of the hat is reached, which completes a half-revolution of the oval plate, and consequently one side of the hat and an entire revolution of the cam-gear, the second revolution of the cam-gear acting to move the slides and forming and curling rollers inward in the same manner to narrow the curl on the opposite side of the hat. Should it be required to widen the oval at the side—that is, to produce an oval wider than any of the ovals of the compound cam—this result would be produced by taking cam gears 112 out from the arms 111 in which they are held, turning them over, and replacing them the other side up. This would produce just the contrary effect from that just described. Instead of moving slides 106 and racks 70 upward and moving the slides carrying the forming and curling rollers inward, the effect would be to move slides 106 and racks 70 downward and to move the slides carrying the forming and curling rollers outward, thus producing a wider curl at the sides of the hat. In other words, when a wider oval is to be produced, I so adjust the cam-gears 112 that they will operate to lower the racks 70 during the time when the forming and curling rollers are operating at the sides of the brim, thus having the effect to throw the curling devices outward in a field of operation beyond the field to which they are carried by the compound cam. On the other hand, when it is desired to narrow the oval at the sides, these gears are adjusted so that they will operate to elevate the racks 70 during the time when the curling devices are operating at the sides of the hat brim, thus causing such devices to be thrown inward and inside the operative field to which they would otherwise be carried by the action of the compound cam. Suppose now that it were required to curl hats the ovals of which were very much narrower at the rear quarters than any of the ovals of the compound cam. This result would be accomplished by the use of cam-gears 120, having lateral curvatures 120ᵃ. When these cam-gears are used, gear 25 is unlocked from the frame and locked tightly to the central spindle in the manner already described. The effect of the lateral curvatures 120ᵃ, through the engagement of said cam gears with recesses 116 in slides 110, is to raise slides 110 and 106 and racks 70 upward and to then lower them, the cam-gears being set so as to produce this movement when the quarters of the hat are being curled. The effect, therefore, is to move the forming and curling rollers inward from the side of the hat to the quarter, that being the lowest point of the curvature and the point at which the curling and forming-rollers are moved farthest inward, and then to move the curling and forming-rollers outward from the quarter to the end. Since there are two of these lateral curvatures 120ᵃ as already explained, although only one is shown in the drawings, the operation just described will be repeated on the opposite quarter of the hat. As the two lateral curvatures are in one-half of the cam-gear, it follows, that, while that part of the gear between said curvatures is in engagement with the gear 25, no movement will be imparted thereby to the slides, and the curling and forming-rollers, this being the time during which the end of the hat is being acted upon by said rollers.

As stated at the beginning of this specification, this machine is built with the express purpose in view of curling the brims of hats blocked to egg-oval shape without disturbing the shape of the hat in the slightest and without requiring additional operations to get the hat back to its egg-oval shape after curling. It might happen, however, that it was required to block hats of a true oval, or if not a true oval an egg-oval of greater width at the rear quarters than any of the ovals of the compound cam. This result would be accomplished by taking cam-gears 120 out from the arms 119 in which they are journaled, turning them over, and replacing them the other side up. Their action would then be, instead of raising slides 110 and 106 and racks 70 and moving the slides carrying the forming and curling rollers inward at the quarters of the hat, to move slides 110 and 106 and racks 70 downward, and consequently to move the slides carrying the forming and curling rollers outward at the quarters. It will be apparent that when slides 110 and 106 and the racks 70 are moved upward and pinions 68 are rotated no movement can be imparted to slide 60, owing to the fact that racks 99 and 102 and pinions 103 act to hold rollers 97 and 101 constantly in engagement with the two sections of the compound cam, so that it is impossible for slide 60 to move except as it is moved by the compound cam. When slide 60 is moved by the compound cam, it is locked to slide 61 by racks 69 and 70 and pinion 68; but when rack 70 is moved upward by means of the cam-gears and slides or through the rotation of the hand-wheel, movement is only imparted to slides 61 and 62, carrying, respectively, the forming and curling rollers, these two slides being locked together by the segment-plate, lever 75, &c. Slots 65 in plates 60 are amply long to permit all the movement of plates 66 that can be required. Racks 70 are always held in engagement with pinions 68 by cross-pieces 67.

Having thus described my invention, I claim—

1. In a machine for curling the brims of hats, the combination of the curling devices carried by slides which are capable of both an independent movement as well as a movement in harmony, a double compound rotary cam composed of two sections exactly alike but having their major axes arranged transverse to each other, and intermediate connections between said slides and sections whereby the slides are actuated, substantially as set forth.

2. The combination of the rotatory controlling cam composed of two axially concentric

4 sections exactly alike but having their major axes arranged transverse to each other, the hat curling devices carried by sliding elements, intermediate mechanism for imparting motion from said cam to said slides, and means for moving said slides independent of said cam, substantially as set forth.

3. The combination of the rotatory cam composed of two axially concentric sections exactly alike and having their major axes arranged transversely to each other, reciprocating sliding elements in contact with said sections respectively, means whereby reverse movements are imparted by said elements each to the other, and the slides which carry the curling devices connected to one of said elements, substantially as set forth.

4. The combination of the rotatory spindle carrying the compound cam composed of two axially concentric sections exactly alike and having their major axes arranged transverse to each other, the hat supporting devices carried by said spindle, means for clamping the hat, the slide 60 having depending therefrom an arm which carries a roller engaging one section of the cam, a roller carried by a slide and engaging the other section of the cam, the last named slide and said arm having racks, a pinion engaging said racks, and the slides which carry the curling devices supported in the slide 60 and moving in harmony therewith but capable also of independent sliding movements, substantially as set forth.

5. The combination of the hollow rotatory spindle supporting the table on which the hats are placed, means for clamping the hats, the compound cam carried by said spindle and composed of two axially concentric sections exactly alike but having their major axes arranged transverse to each other, an arm carrying a roller engaging one section of the compound cam, the hat curling devices, connections between the latter and said arm whereby movements are imparted to such devices, a slide carrying a roller which engages the other section of the compound cam, said slide and arm being provided with racks, and a pinion engaging said racks, substantially as set forth.

6. The combination of the slide 60 within the frame, the slide 61 carried by the slide 60, the slide 62 carried by the slide 61, means for locking the slides 61 and 62 together, the rotatory compound cam composed of two axially concentric sections exactly alike but having their major axes arranged transverse to each other, and operative connections between said cam and slide 60 for positively reciprocating the latter, substantially as set forth.

7. The combination of the slide 60 within the frame, the slide 61 carried by the slide 60, the slide 62 carried by the slide 61, means for locking the slides 61 and 62 together, the rotatory compound cam composed of two axially concentric sections exactly alike but having their major axes arranged transverse to each other, operative connection between said cam and slide 60 for positively reciprocating the latter, and means independent of said cam for imparting to the slides 61, 62, movements which are independent of the slide 60, substantially as set forth.

8. The combination of the rotatory compound cam composed of two axially concentric sections exactly alike but having their major axes arranged transverse to each other, means for clamping the hat in proper position, the slide 60 carrying a roller in contact with one of said sections of the cam and provided with slots and also a rack on its under side, the slide 61 moving in the slide 60 and having twin plates which extend through said slots, the vertical rack and means independent of said cam for actuating the same, the pinion journaled between said plates and engaging said racks, the slide 62 moving in the slide 61 both of such slides being capable of a movement in harmony independent of the slide 60, the curling devices carried by the slides 61, 62, the roller carried by a slide and engaging the other section of said cam, and intermediate connections between the parts which carry said roller whereby said parts are actuated, one by the other, throughout equal distances but in reverse directions, substantially as set forth.

9. The combination, with a rotary spindle carrying a compound cam and provided with means for retaining a hat in place, of slides carrying forming and curling rollers, substantially as described and shown, suitable means for locking said slides together, an arm connected to one of said slides and carrying a roller engaging one section of the compound cam, a roller carried by a slide and engaging the other section of the compound cam, said slide and arm having racks, and a pinion engaging said racks, as and for the purpose set forth.

10. The combination, with the hat holding device, mechanism for acting upon the hat, and a compound cam consisting of two sections having their major axes arranged transversely to each other and axially concentric, each section consisting of a series of ovals and each oval corresponding in outline with the oval on the other section occupying the same relative position, of an arm carrying a roller engaging one section of the compound cam, connections between said arm and the mechanism which acts upon the hat, a slide carrying a roller engaging the other section of the compound cam, said slide and arm having racks, and a pinion engaging said racks, as and for the purpose set forth.

11. The combination, with a hat holding device, mechanism for acting upon the hat, and the compound cam, of slides 60, 61, and 62, suitable means for locking said slides together, a roller carried by an arm extending from one of said slides which engages one section of the compound cam, said arm being provided with a rack, a roller carried by a rack which engages the other section of the compound cam, and a pinion engaging said racks, substantially as described.

12. The combination, with suitable curling mechanism and means for retaining a hat while it is being operated upon, the compound cam, rollers 97 and 101, and intermediate connections, substantially as described and shown, of slide 60, by which roller 97 is carried, slide 61, moving in slide 60, slide 62, moving in slide 61, and suitable means, substantially as described, for locking said slides together.

13. The combination, with the compound cam, rollers 97 and 101, and intermediate connections, substantially as described and shown, of a hat holding device, mechanism for acting upon the hat, slide 60, by which roller 97 is carried and which is provided with slots 65 and a rack 69, slide 61, moving in slide 60 and having plates 66 extending through said slots, rack 70, means for actuating said rack, pinion 68 journaled between the plates and engaging racks 69 and 70, slide 62, moving in slide 61, and means for locking slides 61 and 62 together.

14. The combination, with plate 12, means for retaining a hat thereon, and the adjustable curling-roller, of forming-roller 55, carried by spindle 56, slide 58, having guide 57, in which spindle slides, spring 91 for raising the spindle and roller out of operative position and a pawl 93 for locking the roller in operative position against the power of the spring.

15. The combination, with plate 12 and means for retaining a hat thereon, of slides 61, carrying a forming roller 55 and having notched segment-plate 74, slide 62, carrying curling roller 54 and having hub 77, with perforated turning plug 77[a], and lever 75, pivoted to the segment plate and reduced at its lower end to engage the turning plug and provided at its outer end with a pawl engaging the segment-plate, whereby slide 62 may be moved in or out relatively to slide 61 or said slides may be locked together.

16. The combination, with plate 12, means for retaining a hat thereon, slide 62, and the curling-roller carried thereby, of slide 61, having notched segment-plate 74 and the forming-roller, and lever 75, pivoted to the segment plate and engaging slide 62, the outer end of said lever having a pawl which engages the notches on the segment-plate, whereby the curling-roller may be moved outward away from the forming-roller and the latter may be raised out of operative position when it is desired to put on or remove a hat.

17. The combination with plate 12, means for retaining a hat thereon, slide 61, carrying the forming-roller, slide 62, carrying the curling-roller, and suitable means for locking said plates together, of slide 60, having arm 95, carrying roller 97, and having a rack 102, the compound cam, roller 101 and intermediate connections, and suitable means for locking slide 60 to slides 61 and 62.

18. The combination, with plate 12, means for retaining a hat thereon, slide 62, carrying the curling-roller, slide 61, carrying the forming-roller and having downwardly extending plates 66, and suitable means for locking said slides together, of the compound cam, rollers 97 and 101, and intermediate connections whereby said rollers 97 and 101 are kept in contact with said cam, slide 60, having slots 65, through which plates 66 pass, racks 69 and 70, pinion 68, journaled between plates 66 and engaging said racks, and means for actuating rack 70, said pinion acting to lock slides 60 and 61 together, except when rack 70 is moved vertically.

19. The hat holding device, mechanism for acting upon the hat, the compound cam, slide 61, having downwardly-extending plates 66, slide 62, and slide 60, having slots 65, rack 69, and intermediate connections between slide 60 and the compound cam, in combination with rack 70, pinion 68, journaled between plates 66 and engaging racks 69 and 70, a slide having a threaded rod at its lower end, a gear 39, internally threaded to engage the rod, and means for holding said gear against vertical movement, so that rotation of said gear will move the rod up or down and will move slides 61 and 62 in or out, as may be required.

20. The combination, with a hat-holding device, mechanism for acting upon the hat, the compound cam, slide 61, having downwardly extending plates 66, slide 62, and slide 60, having slots 65 and rack 69, and intermediate connections between slide 60 and the compound cam, of rack 70, pinion 68, journaled between plates 66 and engaging racks 69 and 70, slide 106, having recess 108, spindle 10, having gear 22, and cam-gear 112, constructed as described, which engages said gear and the recess in the slide, whereby slide 106 and rack 70 may be raised and slides 61 and 62 moved inward as and for the purpose set forth.

21. The combination, with a hat-holding device, mechanism for acting upon the hat, the compound cam, and slide 60, having slots 65, rack 69, and roller 97, engaging one section of the compound cam, roller 101, engaging the other section of the compound cam, and a rack-and-pinion connection between said rollers, of slide 61, having plates 66 extending through slots 65, cross-piece 67, connecting said plates, rack 70, having rollers 104, pinion 68, journaled between said plates and engaging racks 69 and 70, slide 106, having a groove in which said rollers slide, and means for actuating said slide, whereby when rack 70 is held against vertical movement slides 60 and 61 are moved inward and outward together by the compound cam and when rack 70 is moved vertically slide 61 is moved in and out independently of slide 60.

22. The combination, with a hat holding device, mechanism for acting upon the hat, spindle 10, the compound cam, and gear 22, detachably secured thereto, of slide 106, having recess 108, cam-gear 112, engaging said recess and gear 22, slide 60, having slots 65, rack 69, and roller 97, engaging one section of the compound cam, roller 101, engaging the one section of the compound cam, a rack-and-pinion connection between said rollers, slide 61, having plates extending through said slots, rack 70, engaging slide 106, and pinion 68, journaled between said plates and engaging racks 69 and 70.

23. The combination, with the forming and curling rollers, means for holding a hat, and slides by which said forming and curling rollers are carried, of the compound cam, rollers 97 and 101, engaging said cam, one of said rollers being connected with the slides, and a rack-and-pinion connection between said rollers.

24. The combination, with the forming and curling rollers, means for holding a hat, slides 61 and 62, by which said rollers are carried, means for locking said slides together, slide 60, having rack 69, rack 70, and pinion 68, engaging said racks, of the compound cam, rollers 97 and 101, engaging said cam, one of said rollers being connected with the slides, a rack-and-pinion connection between said rollers, so that said slides and the forming and curling rollers will all be moved inward and outward by the compound cam, slide 106, engaging rack 70 and having a recess 108, and cam-gear 112, engaging said recess, so that when said cam-gear is rotated the slide and rack 70 will be moved upward and slides 61 and 62, carrying the forming and curling rollers, will be moved independently of slide 60.

25. The hat holding device, mechanism for acting upon the hat, the compound cam, rollers 97 and 101, engaging said cam, a rack-and-pinion connection between said rollers, and slide 60, by which one of said rollers is carried and which is provided with a rack 69, in combination with rack 70, slide 61, carrying a pinion 68, engaging said racks, slide 62, and means for locking said slides together.

26. The hat holding device, mechanism for acting upon the hat, the compound cam, rollers 97 and 101, engaging said cam, a rack-and-pinion connection between said rollers, and slide 60, by which one of said rollers is carried and which is provided with a rack 69, in combination with rack 70, slide 61, carrying a pinion 68, engaging said racks, slide 62, and means for moving rack 70, so that slide 61 may be moved independently of slide 60.

27. The hat holding device, mechanism for acting upon the hat, the compound cam, rollers 97 and 101, engaging said cam, a rack-and-pinion connection between said rollers, and slide 60, by which one of said rollers is carried and which is provided with a rack 69, in combination with rack 70, carrying rollers 104, slide 61, carrying a pinion 68, engaging said racks, vertical slide 106, having a groove engaged by rollers 104 and a recess 108, slide 110, and a socket 109, which receives slide 106 and carries a cam-gear engaging recess 108, whereby rack 70 and the intermediate parts may be moved vertically, for the purpose set forth.

28. The hat holding device, mechanism for acting upon the hat, the compound cam, rollers 97 and 101, engaging said cam, a rack-and-pinion connection between said rollers, and slide 60, by which one of said rollers is carried and which is provided with a rack 69, in combination with rack 70, slide 61, carrying a pinion 68, engaging said racks, vertical slide 106, engaging rack 70 and having recess 108, cam-gear 112, engaging said recess, the spindle 10, a gear 22 on said spindle, means for locking said gear to the spindle, and means for locking said gear independent of the spindle when it is not required to use the cam-gear.

29. The combination, with spindle 10 and plate 12, having recess 52, of hat holder A, having opening 45, slides 51, lying in recess 52 and having blocks extending upward into opening 45, and a movable rod 31 within the spindle, having at its upper end a cone engaging the slides, whereby the latter are moved outward and caused to engage the end walls of opening 45 to lock the holder in position on plate 12.

30. Hat holder A, consisting of an oval plate corresponding with the crown-opening of a hat and provided with a central opening 45, bearing a definite relation to the size of the plate, and openings 46, in line with opening 45, containing spring-actuated pins the ends of which project into opening 45 in the retracted position and in the thrown position project beyond the edge of the plate and engage the hat, and sliding blocks by which the pins are moved outward.

31. The combination, with plate 12, having recess 52, and movable rod 31, having cone 32, of plate 44, having central opening 45 and spring actuated pins 47, and slides 51, carrying blocks 50, which are engaged by the cone and moved outward against the walls of opening 45 to lock the plate in position and also to move the pins outward to engage the hat.

32. The combination, with the hat-holder, rod 31, and cone 32, of slides 60, 61, and 62, the forming and curling rollers, the compound cam, rollers 97 and 101, engaging said cam, a rack-and-pinion connection between said rollers, gear wheels 36 and 39, and intermediate connections, substantially as described and shown, whereby when gear wheel 36 is rotated rod 31 and the cone are moved upward to lock the holder in position and the slides carrying the forming and curling rollers are moved into operative position.

33. The combination, with the compound cam, plate 12, and the hat holder, of slides 60 on opposite sides of the machine, intermediate connections, substantially as described and shown, between said slides and the compound cam, slides 61, recessed in slides 60 and having brackets 59, carrying forming-rollers, slides 62, recessed in slides 61 and having brackets 84 provided with boxes 87, and brackets 78, carrying curling-rollers, shaft 86, carried by bracket 89, bevel gears 85, keyed to said shaft, but adapted to slide thereon, and intermediate connections, substantially as described and shown, by which the curling-rollers are driven.

34. The combination, with a hat holding device, the compound cam, rollers 97 and 101, engaging said cam, and a connection between said rollers, which causes them to move toward and from the compound cam, of an adjustable forming roller carried by a slide 61, a curling-roller carried by a slide 62, a slide 60, carrying roller 97, and suitable means for locking said slides together and also for moving the curling-roller independently of the other slides.

35. The combination, with a hat holding device, the compound cam, a central spindle by which it is carried, suitable means for adjusting said cam on the spindle, rollers 97 and 101, engaging said cam, and a connection between said rollers to move toward and from the compound cam, of the forming and curling rollers, independent slides by which they are carried, a slide carrying roller 97, and suitable means for locking said slides together and for moving the slide carrying the curling roller independently of the others.

36. The combination, with a hat holding device, the compound cam, rollers 97 and 101, engaging said cam, and a connection between said rollers to move them toward and from the compound cam, of the forming and curling rollers, suitable means for heating the curling roller, independent slides by which said rollers are carried, a slide carrying roller 97, and suitable means for locking said slides together and for moving one slide independently of the others.

37. The combination, with a hat-holding device, the compound cam, rollers engaging said cam, and a connection between said rollers to move them toward and from the compound cam, of slides 60, 61, 62, a forming-roller carried by slide 61, a curling-roller carried by slide 62, suitable means for locking said slides together and for moving slide 62 independently of the others, and suitable means for moving slides 61 and 62 independently of slide 60.

38. The combination, with the hat-holding device, mechanism for acting upon the hat, the compound cam, rollers engaging said cam, and a connection between said rollers to move them toward and from the compound cam, of slides 60, 61, and 62, suitable means for connecting slides 61 and 62 and for moving slide 62 independently of slide 61, means for connecting slide 61 to slide 60, and means for moving slides 61 and 62 independently of slide 60.

39. The combination, with a hat-holding device, mechanism for acting upon the hat, slides 60, 61, and 62, the compound cam, a roller carried by slide 60, engaging one section of the cam, a roller engaging the other section of the cam, and a connection between said rollers acting to move them toward and from the compound cam, of gear 22, cam gear 112, meshing therewith, and intermediate connections between said cam-gear and the slides, whereby slides 61 and 62 may be moved independently of slide 60.

40. The hat holding device, mechanism for acting upon the hat, slide 60, having slots 65, rack 69, and rollers 97 and 101 and intermediate connections, slide 61, having plates extending through said slots, a cross-piece 67 between said plates, and a pinion journaled in said plates and engaging the rack, in combination with the compound cam engaged by said roller, rack 70, which is held by the cross-piece and engages the pinion, and suitable means for moving rack 70, so that when said rack is held against vertical movement the slides will be moved together by the compound cam and when vertical movement is imparted to the rack slide 61 will be moved independently of slide 60.

41. The hat holding device, mechanism for acting upon the hat, slide 60, having slots 65, rack 69, and rollers 97, and 101 and intermediate connections, slide 61, having plates extending through said slots, a cross-piece 67 between said plates, and a pinion journaled in said plates and engaging the rack, in combination with the compound cam engaged by said roller, rack 70, engaging said pinion and having at its lower end rollers 104, slide 106, having a groove engaged by said rollers and recess 108, and a cam-gear engaging said recess and acting when rotated to lift slide 106 and rack 70 and to move slide 61 independently of slide 60.

42. The hat holding device, mechanism for acting upon the hat, slide 60, having slots 65, rack 69, and rollers 97 and 101 and intermediate connections, slide 61, having plates extending through said slots, and a pinion journaled in said plates and engaging the rack, in combination with the compound cam engaged by said roller, rack 70, engaging said pinion and having at its lower end rollers 104, slide 106, having a groove engaged by said rollers and a recess 108, a cam-gear engaging said recess and acting when rotated to lift slide 106 and rack 70 and to move slide 61 independently of slide 60, gear 22, engaging the cam-gear, a spindle by which said gear is carried, and means for locking said gear to the spindle and also for locking it against rotation when disconnected from the spindle.

43. The hat holding device, mechanism for acting upon the hat, the compound cam, rollers 97 and 101, connections between said rollers, slide 60, having slots 65 and rack 69, slide 61, having plates extending through said slots, and a pinion journaled in said plates, in combination with rack 70, engaging said

BEST AVAILABLE COPY pinion, slides 106 and 110 and intermediate connections, threaded rod 118, gear-wheel 39, engaging the threaded rod and having an annular groove 37, angle-piece 38, engaging said groove to hold the gear-wheel in position, and suitable means for rotating said gear-wheel to raise and lower the threaded rod and the slides, as and for the purpose set forth.

44. The combination, with slide 61, having bracket 59, the segment-plate, and lever 75, and slide 62, having bracket 78, hub 77, and turning plug 77ª, engaged by lever 75, of the forming-roller carried by bracket 59, the curling-roller carried by bracket 78, and suitable means for imparting rotation to the curling-roller.

45. The combination, with slide 61, having bracket 59, the segment-plate, and lever 75, and slide 62, having bracket 78, hub 77, and turning plug 77ª, engaged by lever 75, of the forming-roller having a spindle 56, a slide 58, engaging bracket 59 and having a guide through which the spindle passes, a spring acting to hold the spindle and roller at the raised position, a pawl for locking said roller in operative position, the curling roller carried by bracket 78, and pawl 94 for locking the lever to the segment-plate.

46. The combination, with slides 62 on opposite sides of the machine, each of said slides having boxes 82ª, carrying shafts 82, and boxes 87, and curling rollers journaled in said slides, of shaft 86, journaled in boxes 87, bevel gears 85 keyed to said shaft but adapted to slide thereon and bevel gears on shaft 82, whereby motion is imparted to the curling rollers.

47. The curling-rollers, shafts by which they are carried, bevel-gears 80 on said shafts, and slides 62, in which said shafts are journaled and which are provided with boxes 87, in combination with shafts 82, bevel-gears at both ends of said shafts, shaft 86, and bevel-gears 85 keyed to said shaft, but free to slide thereon, said gears being held by boxes 87 in engagement with gears on shafts 82.

48. The combination, with the hat-holder, the rod and cone by which it is operated, the forming and curling-rollers, slides 60, 61, and 62, the compound cam, and connections, substantially as described and shown, between said slides and the cam, of gear-wheels 36 and 39, threaded rods 33 and 118, engaged by said gear-wheels, angle-piece 38, holding said gear-wheels in position, and intermediate connections between threaded rod 118 and the slides, so that when said gear-wheels are rotated the cone is moved upward to lock the hat-holder in position and the forming and curling rollers are simultaneously moved into operative position.

49. The combination, with the compound cam consisting of two sections, each section consisting of a series of ovals and each oval corresponding in outline with the oval on the other section occupying the same relative position, slides 60, 61, and 62, and intermediate connections, substantially as described and shown, between said slides and the cam, of forming and curling rollers carried by said slides, suitable means for connecting said slides together, so that all are moved by the cam, and suitable means for moving slides 61 and 62 independent of slide 60, as and for the purpose set forth.

50. The combination, with the hat holder, cone and rod 31, by which it is operated, the forming and curling rollers, and slides 60, 61, and 62, of slides 106 and 110, and intermediate connections whereby the movements of said slides are imparted to slides 61 and 62 independently of slide 60, threaded rods 33 and 118, and gears 36 and 39, engaging said rods, whereby the cone and slides are actuated simultaneously to lock the hat holder and to place the forming and curling rollers in operative position.

51. The combination, with the hat-holder, of forming roller 55, having shank 56, slide 58, having guide 57, spring 91 for throwing the forming roller out of operative position, and pawl 93 for locking it in operative position, the curling roller, slides 61 and 62, having brackets 59 and 78, by which said rollers are carried, and connections between said slides, which permit slide 62 and the curling roller to be moved backward, so that the forming-roller may be raised out of operative position.

52. The combination, with plate 12 and the hat holder, of slide 61, having bracket 59, slide 58, engaging said bracket and having a guide 57, spindle 56 in said guide, the forming-roller carried by said spindle, spring 91, adapted to lift the forming roller out of operative position, slide 62, the curling roller carried thereby, hub 77, having a turning plug 77ª, the segment-plate, and lever 75, engaging the turning plug and having a pawl engaging the segment plate.

In testimony whereof I affix my signature in presence of two witnesses.

THOMAS E. AVERY.

Witnesses:
WILLIAM T. GRAY,
LEVI K. MANSFIELD.